Figure 1:
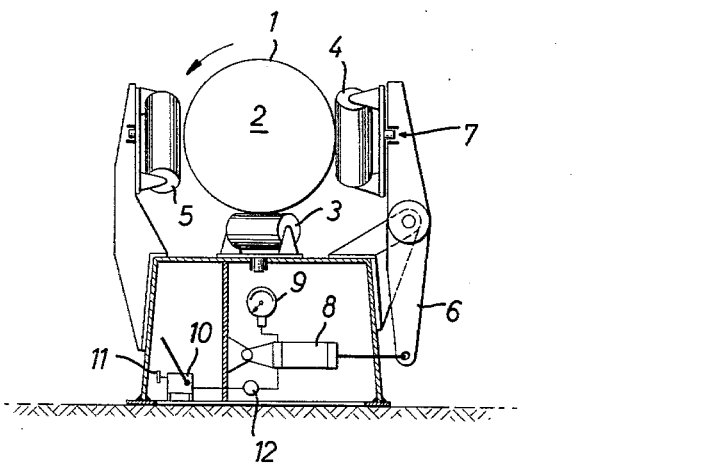

Sept. 28, 1965 W. ECKHARDT 3,208,138
METHOD AND APPARATUS FOR ADJUSTING THE WELDING-GAP
WIDTH IN A HELICAL-SEAM TUBE-MAKING INSTALLATION
Filed Sept. 24, 1962 2 Sheets-Sheet 1

FIG. I

INVENTOR
WILHELM ECKHARDT
BY: Dicke & Craig
ATTORNEYS

United States Patent Office 3,208,138
Patented Sept. 28, 1965

3,208,138
METHOD AND APPARATUS FOR ADJUSTING THE WELDING-GAP WIDTH IN A HELICAL-SEAM TUBE-MAKING INSTALLATION
Wilhelm Eckhardt, Paris, France, assignor to Driam S.A., Vaduz, Liechtenstein
Filed Sept. 24, 1962, Ser. No. 225,650
7 Claims. (Cl. 29—477.3)

The present invention relates to a method for adjusting the width of the welding gap during manufacture of a helical-seam tube or pipe and to an apparatus for carrying out such method.

The manufacture of such tubes or pipes takes place by the supply or feed of the metallic strip or band material to a forming tool under an adjustable and changeable angle and by the removal of the tube formed after welding of the band edges, by way of a guide system, such as supports, steady-rests, or the like, whereby also the angle between the axis of the tube and the line which connects the center points of curvature of the concave surfaces of the forming tool and referred to hereinafter as tool axis, may also be changed during the tube manufacture for the purpose of fine regulation of the welding-gap width.

The fine regulation or adjustment of the welding gap width in accordance with the changes occurring during operation has been realized heretofore in that the operator manipulating the manufacturing installation visually observes changes in the welding gap width and thereupon manually changes the angle between the tube axis and the tool axis, or in that the width of the gap is measured or sensed ahead of the welding point and the welding gap width is so controlled that it remains constant, or is at all times zero, if one also ignores that it is also known to observe the welded seam itself and possibly to control in accordance therewith the welding gap width.

The present invention is based on the consideration that in the normal operation it is important that the welding gap width is zero, that is, the edges of the band or strip material to be welded with one another contact each other at the place at which the welding seam begins. Even when the welding gap width is not equal to zero, the tube always seeks to displace itself in the direction of an increase in the supply of feed angle α to the forming tool; however, it is prevented against such displacement by a roller coordinated to or associated with the support or steady rest. If now, as proposed in accordance with the present invention, the pressure exerted on the tube guide system by the helical-seam tube is measured continuously, and if the pressure fluctuations are utilized as a measure for the change of the angle between the tube axis and the tool axes, then the width of the welding gap may be maintained constant without great difficulties.

An installation for carrying out this method in accordance with the present invention is characterized by the fact that the roller of the support, steady rest or the like, on which acts the helical-seam tube or pipe in the manner mentioned hereinabove, is adjustable and is operatively connected with a pressure-measuring apparatus. If the metallic band or tape to be deformed is guided, for example, in a horizontal plane, that is, if the welding place is located in proximity to the vertical axis of the tube or pipe cross section, then the measuring apparatus also has to measure the horizontal component of the pressure which the pipe or tubing exerts on the support or steady rest. It is preferable to utilize as measuring apparatus such an apparatus which carries out no or only relatively small measuring movements or none at all; suitable apparatus being for example, hydraulic pressure-measuring boxes or similarly operating apparatus which function on an electro-capacitive basis. The support of this pivotal roller may also be connected either directly or indirectly with the piston rod of a piston guided within a cylinder whereby there is connected to the pressure space of the cylinder a conventional manometer, in addition to a pump provided with a discharge valve and serving for the adjustment of a selectable pressure. The pump which is adapted to be disconnected from the cylinder when measurements are taken, may also serve for the purpose of adjusting the support or steady rest roller. If a contact manometer is provided as manometer, then such manometer may control the change of the angle between the tube axis and the tool axis.

Accordingly, it is an object of the present invention to provide a method and apparatus for adjusting the welding-gap width in a helical-seam tube-making installation which avoids the drawbacks encountered in the prior art constructions.

It is another object of the present invention to provide a method and apparatus for adjusting the welding-gap width in a helical-seam tube-making installation which is extremely reliable and accurate in operation notwithstanding its simplicity and which permits at all times the accurate maintenance of a predetermined welding-gap width.

A further object of the present invention resides in the provision of a method and apparatus for adjusting the welding-gap width in a helical-seam tube-making installation in which relatively few parts are necessary to eliminate the inaccuracies stemming from visual observation or measurements of the gap width.

These and other objects, features and advantages of the present invention will become more obvious from the following description when taken in connection with the accompanying drawing which shows, for purposes of illustration only, in the single figure thereof, one embodiment in accordance with the present invention in which the support roller is directly connected with the measuring apparatus and in which the parts are schematically illustrated for sake of simplicity.

Figure 2:
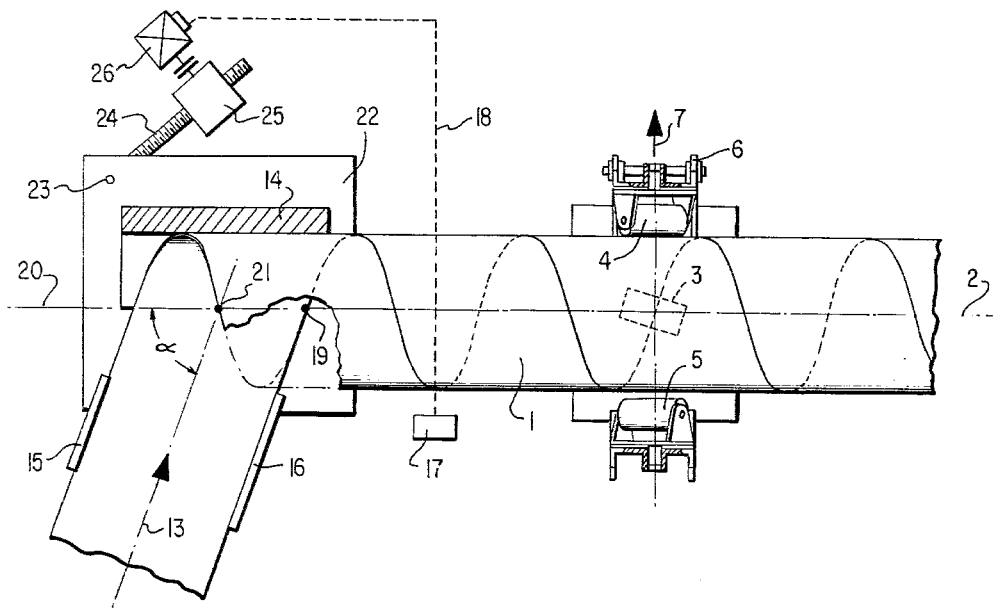

Referring now to the drawings:

FIGURE 1 shows schematically an elevational view of the support or steady rest arrangement in accordance with the present invention, and FIGURE 2 shows schematically a plan view, partly in section, of the support shown in FIGURE 1 together with a helical-seam tube-making installation.

As shown in FIGURE 1 the helical seam tube or pipe 1 is disposed to the rear of the helical-seam tube-making installation, as viewed in a direction opposite the exit direction of the tube, the direction of rotation of the tube or pipe being assumed to be in the counterclockwise direction. As shown in FIGURE 2, the support or steady rest is coordinated to a helical-seam tube-making installation of the type which is so constructed that the support or steady rest may be arranged in a relatively fixed manner. Consequently, with such an arrangement, the tube or pipe axis 2 maintains at all times its indicated direction irrespective of whether or not the supply or feed angle α or the angle between the tube axis and the tool axis changes. The support or steady rest arrangement includes three guide rollers 3, 4 and 5, which are adapted to be adjusted with different inclinations corresponding to the angle of inclination or pitch of the helical seam. The lower guide roller 3 acts as supporting roller for the welding tube, that is, it absorbs the weight of the helical-seam tube 1. The guide roller 4 is supported at a pivotal double-lever 6 and thereby absorbs the pressure of the helical-seam tube 1 acting in the direction of arrow 7. This pressure is transmitted by way of a displaceable piston arranged within a cylinder 8 to the pressure medium present within the cylinder 8 and produces thereat a hydraulic excess-pressure which may be read on the manometer 9. The correct filling and adjustment of the piston within the cylinder 8 may be attained in a known manner, for example, by a hydraulic pump 10 and a discharge valve 11. A closure valve 12 is provided between the cylinder 8 and the pump 10. The guide roller 5 is intended as safety means against a possible displacement of the pipe 1.

In the coordinated arrangement shown in FIGURE 2, reference numeral 13 designates the axis of the strip which is formed to a tube, this axis constituting the supply or forming angle α with the tool axis 20. Reference numeral 14 is used to designate the forming tool, while 15 and 16 designate the guides or controls for the strip to be formed. Reference numeral 17 identifies the push button border panel which can regulate or control in both directions of rotation by means of electrical circuits 18 and electric motor 26. Reference numeral 19 refers to the welding spot at which the two band edges touch one another for the first time. Reference numeral 21 indicates the pivot point about which the tool 14 and the rotary table may be pivoted. Reference numeral 23 designates the point of attack of the lead screw 24 which may be moved away from the motor 26 by the worm gear 25.

OPERATION

The operation of the adjusting mechanism illustrated in the single figure of the drawing is as follows:

With a predetermined abutment pressure of the helical-seam tube 1 at the guide roller 4, there exists within cylinder 8 a corresponding hydraulic excess-pressure that can be read on manometer 9. When this pressure changes, then it is an indication that similar pressure change has also occurred within the welding-gap so that the operator handling the tube-making installation can actuate the corresponding control apparatus until the previously existing pressure can be re-established.

While I have shown and described one embodiment in accordance with the present invention, it is understood that the same is not limited thereto but is susceptible of many changes and modifications within the spirit and scope thereof, as known to a person skilled in the art. For example, instead of a visual reading of the manometer and a manual control of the angle between the tube axis and the tool axis, it is also within the scope and purview of the present invention to provide a control system, for example, by means of contact manometer or similar apparatus that is fully automatic.

Thus, it is obvious that the present invention is susceptible of many changes and modifications within the scope and spirit thereof, and I therefore do not wish to be limited to the details shown and described herein, but intend to cover all such changes and modifications as are encompassed by the scope of the appended claims.

I claim:

1. In the manufacture of a helical-seam tube from a metallic band material that is supplied to a forming tool at an adjustable angle and the edges of which are welded together for the formation of the tube, whereupon the tube is removed by way of a guide system, and in which the angle between the tube axis and the line connecting the center points of curvature of the concave surfaces of the forming tool may be changed during tube manufacture, the improvement essentially consisting of a method for adjusting the welding gap width comprising the steps of measuring the pressure exerted on the guide system by the helical-seam tube in the plane of supply of the undeformed band, and controlling the change in the angle between the tube axis and the tool axis in accordance with the pressure fluctuations.

2. In the manufacture of a helical-seam tube from a metallic band material that is supplied to a forming tool at an adjustable angle and the edges of which are welded together for the formation of the tube, whereupon the tube is removed by way of a guide system, and in which the angle between the tube axis and the line connecting the center points of curvature of the concave surfaces of the forming tool may be changed during tube manufacture, the improvement essentially consisting of a method for adjusting the welding gap width comprising the steps of constantly measuring the pressure exerted on the guide system by the helical-seam tube in the plane of supply of the undeformed band, and controlling the change in the angle between the tube axis and the tool axis in accordance with the pressure fluctuations.

3. In the manufacture of a helical-seam tube from a metallic band material that is supplied to a forming tool at an adjustable angle and the edges of which are welded together for the formation of the tube, whereupon the tube is removed by way of a guide system, and in which the angle between the tube axis and the line connecting the center points of curvature of the concave surfaces of the forming tool may be changed during tube manufacture, the improvement essentially consisting of a method for adjusting the welding gap width comprising the steps of constantly measuring the pressure exerted on the guide system by the helical-seam tube in the plane of supply of the undeformed band, and automatically controlling the change in the angle between the tube axis and the tool axis in accordance with the pressure fluctuations.

4. In an installation for manufacturing a helical-seam tube from a metallic band material which is supplied to a deforming tool at an adjustable angle, is deformed in the forming tool and of which the edges are welded together for the formation of the tube, and in which the tube is run-off by way of a stationary guide system, the angle between the tube axis and the line connecting the center points of curvature of the concave surfaces of the forming tool being also adjustable during tube manufacture,
   the improvement essentially consisting of a relatively fixed guide system including roller means,
   means for measuring the pressure exerted on said roller means by the finished tube in the plane of supply of the undeformed band material,
   and means for selectively changing the angle between said tube axis and tool axis in accordance with the pressure fluctuations measured by said measuring means.

5. In an installation for manufacturing a helical-seam tube from a metallic band material which is supplied to a deforming tool at an adjustable angle, is deformed in the forming tool and of which the edges are welded together for the formation of the tube, and in which the tube is run-off or removed by way of a stationary guide system, the angle between the tube axis and the line connecting the center points of curvature of the concave surfaces of the forming tool being also adjustable during tube manufacture,
   the improvement essentially consisting of a relatively fixed guide system including roller means,
   and means for measuring the pressure exerted on said roller means by the finished tube within the plane of supply of the undeformed band material including a cylinder slidingly receiving therein a piston,
   means operatively connecting said roller means with said piston,
   pump means provided with a discharge valve and operatively connected with the pressure space of the cylinder, a pressure gauge also operatively connected with said pressure space, and a closure valve between said pump means and said pressure space.

6. In an installation for manufacturing a helical-seam tube from a metallic band material which is supplied to a deforming tool at an adjustable angle, is deformed in the forming tool and of which the edges are welded together for the formation of the tube, and in which the tube is run-off by way of a stationary guide system, the angle between the tube axis and the line connecting the center points of curvature of the concave surfaces of the forming tool being also adjustable during tube manufacture,
   the improvement essentially consisting of a relatively fixed guide system including roller means, means for measuring the pressure exerted on said roller means by the finished tube in the plane of supply of the undeformed band material, and means including contact manometer means for selectively changing the angle between said tube axis and tool axis in accordance with the pressure fluctuations measured by said measuring means.

7. In an installation for manufacturing a helical-seam tube from a metallic band material which is fed to a deforming tool at an adjustable angle, is deformed in the forming tool and of which the edges are welded together for the formation of the tube, and in which the tube is run-off or removed by way of a stationary guide system, the angle between the tube axis and the line connecting the center points of curvature of the concave surfaces of the forming tool being also adjustable during tube manufacture, the improvement essentially consisting of a relatively fixed guide system including roller means, the finished helical-seam tube constantly acting on said roller means in the sense of an increase in the feed angle and means for measuring the pressure exerted on said roller means by the finished tube.

References Cited by the Examiner
UNITED STATES PATENTS

| | | | |
|---|---|---|---|
| 3,030,488 | 4/62 | Kuckens | 113—35 |
| 3,070,054 | 12/62 | Grieten | 113—35 |

FOREIGN PATENTS 1,118,129 11/61 Germany.

CHARLES W. LANHAM, *Primary Examiner.*